(12) United States Patent
Squilla et al.

(10) Patent No.: US 6,810,149 B1
(45) Date of Patent: Oct. 26, 2004

(54) METHOD AND SYSTEM FOR CATALOGING IMAGES

(75) Inventors: John R. Squilla, Rochester, NY (US); Dale F. McIntyre, Honeoye Falls, NY (US)

(73) Assignee: Eastman Kodak Company, Rochester, NY (US)

( * ) Notice: Subject to any disclaimer, the term of this patent is extended or adjusted under 35 U.S.C. 154(b) by 533 days.

(21) Appl. No.: 09/640,938

(22) Filed: Aug. 17, 2000

(51) Int. Cl.[7] .............................. G06K 9/62; G06K 9/54; G06F 13/00
(52) U.S. Cl. .................. 382/224; 382/305; 345/835
(58) Field of Search .......................... 345/835, 837, 345/764, 765, 776, 841, 845, 851, 854; 382/306, 305, 181, 224, 190, 194, 195, 203, 209

(56) References Cited

U.S. PATENT DOCUMENTS

| | | | |
|---|---|---|---|
| 5,202,828 A | 4/1993 | Vertelney et al. | 715/530 |
| 5,303,388 A | 4/1994 | Kreitman et al. | 345/836 |
| 5,323,314 A | 6/1994 | Baber et al. | 705/8 |
| 5,367,624 A | 11/1994 | Cooper | 345/734 |
| 5,544,302 A | 8/1996 | Nguyen | 345/837 |
| 5,555,354 A | 9/1996 | Strasnick et al. | 345/427 |
| 5,664,128 A | 9/1997 | Bauer | 345/708 |
| 5,668,964 A | 9/1997 | Helsel et al. | 345/776 |
| 5,689,286 A * | 11/1997 | Wugofski | 345/835 |
| 5,731,844 A * | 3/1998 | Rauch et al. | 725/40 |
| 5,751,287 A | 5/1998 | Hahn et al. | 345/775 |
| 5,812,995 A * | 9/1998 | Sasaki et al. | 707/1 |
| 5,943,049 A * | 8/1999 | Matsubara et al. | 345/715 |
| 5,953,007 A | 9/1999 | Center et al. | 345/764 |
| 5,963,203 A | 10/1999 | Goldberg et al. | 345/723 |
| 5,970,471 A * | 10/1999 | Hill | 705/26 |
| 6,028,603 A | 2/2000 | Wang et al. | 345/776 |
| 6,137,897 A | 10/2000 | Emi et al. | 382/128 |
| 6,426,800 B1 * | 7/2002 | Mizuno et al. | 358/1.15 |
| 6,466,241 B1 * | 10/2002 | Schindler | 345/854 |
| 6,477,315 B1 * | 11/2002 | Ohomori | 386/55 |
| 6,483,525 B1 * | 11/2002 | Tange | 345/765 |
| 6,519,584 B1 * | 2/2003 | Tognazzini et al. | 707/3 |
| 6,622,148 B1 * | 9/2003 | Noble et al. | 707/104.1 |

FOREIGN PATENT DOCUMENTS

JP        10275150        10/1998        ........... G06F/17/30

OTHER PUBLICATIONS

"Media Streams: An Iconic Visual Language for Video Annotaton" by Marc Davis, Visual Languages 1993, Proceedings 1993 IEEE Symposium on Bergen, Norway Aug. 24–27, 1993, Los Alamitos, CA.

FotoFile: A Consumer Multimedia Organization and Retrieval System; Allan Kuchinskky et al.

* cited by examiner

*Primary Examiner*—Andrew W. Johns
*Assistant Examiner*—Amir Alavi
(74) *Attorney, Agent, or Firm*—Frank Pincelli

(57) ABSTRACT

A method and computer software product for the categorization and/or retrieving of digital images. At least one selection category having at least one image icon is provided for association with the image to be categorized and/or retrieved. The software product is designed for personalization by the user and allows the formation of personalized image icon.

26 Claims, 12 Drawing Sheets

METHOD AND SYSTEM FOR CATALOGING IMAGES

FIELD OF THE INVENTION

The present invention is directed to cataloging of digital images. More particularly, the software and system for cataloging digital images into an electronically stored collection or library.

BACKGROUND OF THE INVENTION

Photographs are taken for a variety of personal and business reasons. During the course of the year an individual may take numerous photographs of various events. During these events, quite often there is a variety of different individuals and items present in these photographs. In the prior art, when one desires to catalog these images in a particular order, they usually are left to placing these images manually into photograph albums. This is a very extensive, manual procedure requiring a significant amount of time. In addition, it is very limited with regard to the amount of information that can be associated with the image in a quick and easy manner. While some photo albums allow the writing and placing of text, the entering of this data is a very time consuming and arduous affair. Once having sorted these images into particular albums which may represent categories of interest, it is extremely difficult to retrieve and/or reorganize the images into other categories. With the advent of digital cameras and digital imaging, it is known that these images can be stored in databases. However, there is no easy and quick or efficient way for cataloging of these images, retrieving and/or reorganizing these images.

Applicants have invented an efficient method and system for organizing digital images in a quick and efficient manner. The organized images can be easily retrieved and reorganized by a variety of criteria.

SUMMARY OF THE INVENTION

In accordance with one aspect of the present invention there is provided a computer software product comprising a computer readable storage medium having a computer program which when loaded into a computer of an image forming device causes the computer to perform the following steps:

displaying at least one image for categorization;

providing at least one selection category having at least one image association icon that can be associated with the image to be reviewed.

In accordance with another aspect of the present invention there is provided a method for organizing a plurality of images comprising the steps of:

displaying at least of the plurality of images;

categorizing at least one of the plurality of images using an image icon for at least one selection category.

In accordance with yet another aspect of the present invention there is provided a computer software product comprising a computer readable storage medium having a computer program which when loaded into a computer of an image forming device causes the computer to perform the following steps:

retrieving at least one image from a plurality of images that have been previously categorized;

providing at least one selection category having at least one image association icon that can be associated with the image to be reviewed.

In accordance with still another aspect of the present invention there is provided a method for personalizing an image computer software program, comprising the steps of:

a. providing a categorization/retrieval program that uses categories and image icons for use in categorizing and/or retrieving digital images;

b. selecting from a plurality of stored categories at least one selection category; and c. selecting from a plurality of stored image icons at least one image icon for use with at least one selection category.

In accordance with another aspect of the present invention there is provided a method for retrieving an image from a plurality of images that have been previously categorized, comprising the steps of:

retrieving at least one image from a plurality of images that been previously categorized;

providing at least one selection category having at least one image association icon that can be associated with the image to be reviewed In accordance with yet still another aspect of the present invention there is provided a method for automatically organizing a plurality of images comprising the steps of:

providing at least one image icon associated with a category, using predetermined characteristics of the icon for use in identifying non-categorized images for association with the category.

In accordance with another aspect of the present invention there is provided a computer software product for automatically categorizing images comprising a computer readable storage medium having a computer program which when loaded into a computer of an image forming device causes the computer to perform the following steps:

providing at least one image icon associated with a category, using predetermined characteristics of the icon for use in identifying non-categorized images for association with the category.

The above, and other objects, advantages and novel features of the present invention will become more apparent from the accompanying detailed description thereof when considered in conjunction with the following drawings.

BRIEF DESCRIPTION OF THE DRAWINGS

In the detailed description of the preferred embodiments of the invention presented below, reference is made to the accompanying drawings in which.

DETAILED DESCRIPTION OF THE INVENTION

Figure 1:
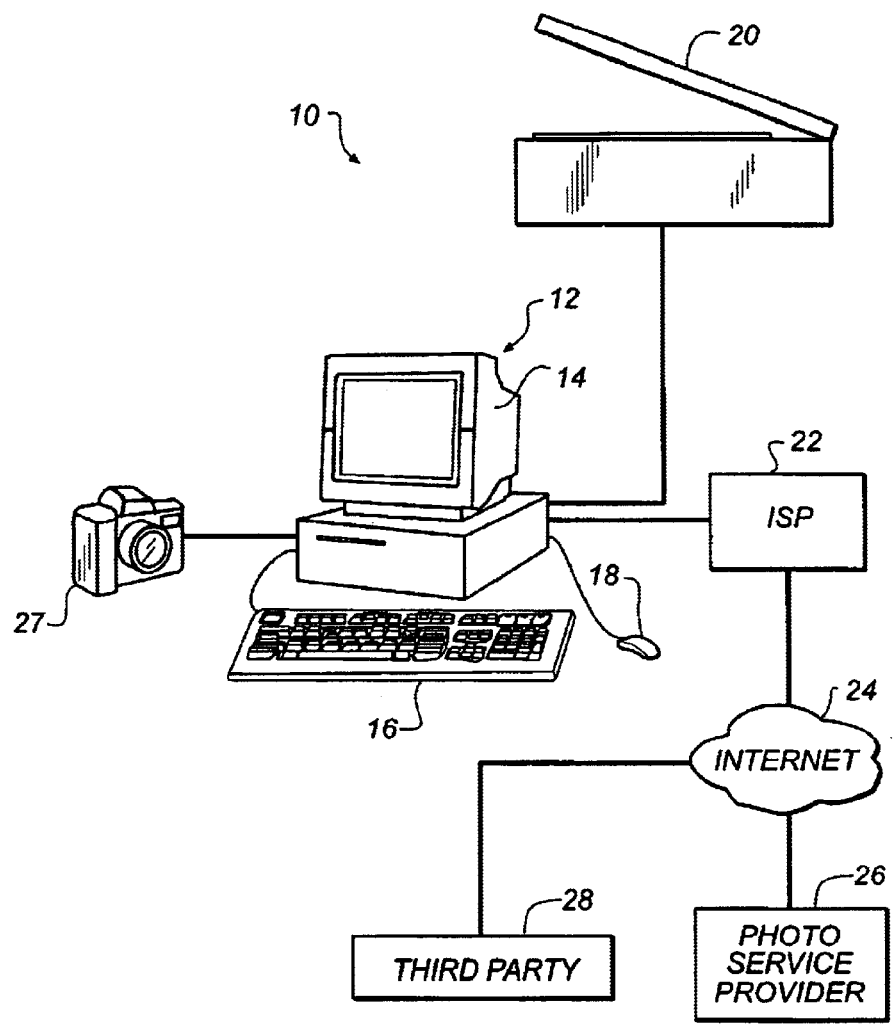
FIG. 1 is a schematic diagram of a system for use in practicing the present invention.

Referring to FIG. 1 there is illustrated a system 10 made in accordance with the present invention. The system includes a computer 12 for processing data and information. The computer 12 also includes an appropriate processor and memory storage for the running of software programs and storing of digital data as is customarily done by computers. In the embodiment illustrated, computer 12 is a personal computer having a display device 14 which in the particular embodiment is a CRT. The computer 12 also includes input devices 16 and 18 for entering of data into the computer 12 by the user. In particular, input device 16 is a keypad and input device 18 is a mouse. However, it is to be understood that any input device or means may be employed, for example, but not by way of limitation, to a voice recognition system. A scanner 20 is provided for scanning of hard copy images for obtaining digital files of images. The scanned images are digitized and forwarded to computer 12 as is well known in the art. Computer 12 is also provided with appropriate communication hardware and software, as is well known in the art, for allowing communication with third parties. In the embodiment illustrated, the communication hardware and software allows communication to an internet service provider ISP 22 which in turn allows communication with the internet 24. The internet 24, as is well known, allows electronic communication with various other parties. The system 10 also includes a photoservice provider 26 capable of providing digital imaging goods and/or services. These goods and services may be requested by customers over the internet 24 or by any other means, for example, but not by way of limitation through the use of order envelopes containing image products having images thereon. The ordered goods and/or services may be provided to the customer over the internet 24 or by forwarding such goods and/or services directly to the customer through the mail, or other delivery system. As is illustrated, a third party 28 may also be connected to internet 24 for communication with others that are connected to internet 24.

Figure 2:
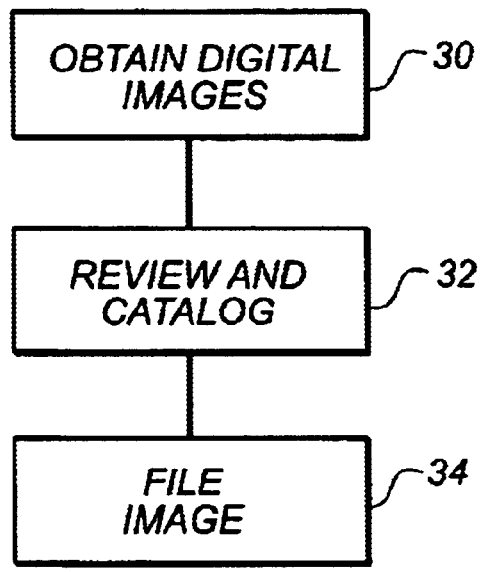
FIG. 2 is flow chart of the operation of a computer software program made in accordance with the present invention.

Referring to FIG. 2, there is illustrated a flow diagram of the operation of a computer software program made in accordance with the present invention. The software program is designed such that when loaded onto a computer, it will cause the computer to perform the steps set forth in FIG. 2. In particular, the first step 30 of software program allows the user to obtain digital images from any appropriate source. For example, as illustrated by FIG. 1, digital images may be obtained by scanning of images by the user, or from a digital device such as a digital camera, or from a stored digital data file on the computer 12. Alternatively, the images may be obtained from the third party 28 over a communication network such as the internet 24. For example, a roll of photographic film may have been sent to service provider 26 where the film would have been developed and digitally scanned so as to provide a digital record of the images contained thereon. The scanned digital images would then be forwarded to the user over the internet 24 and ISP 22 allowing access by the user at computer 12. In the next step 32, the selected images are reviewed and categorized. After completion of step 32, the images at step 34 are used as desired. For example, the categorized images would be sent to a data storage file, to a third party, a service provider for obtaining desired goods and/or services, or possibly to a printer.

Figure 3A:
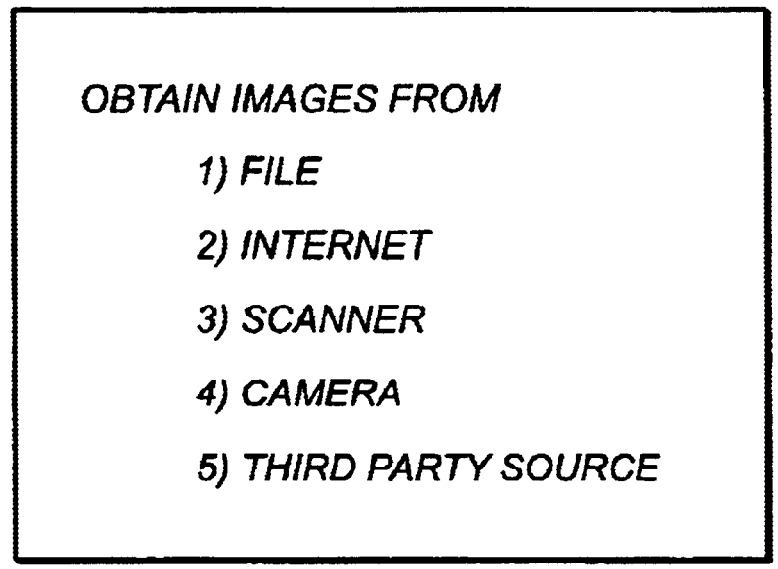
FIGS. 3A–3H illustrates various display screens that are developed as a result of the use of the software program made according to the present invention.
Figure 3B:
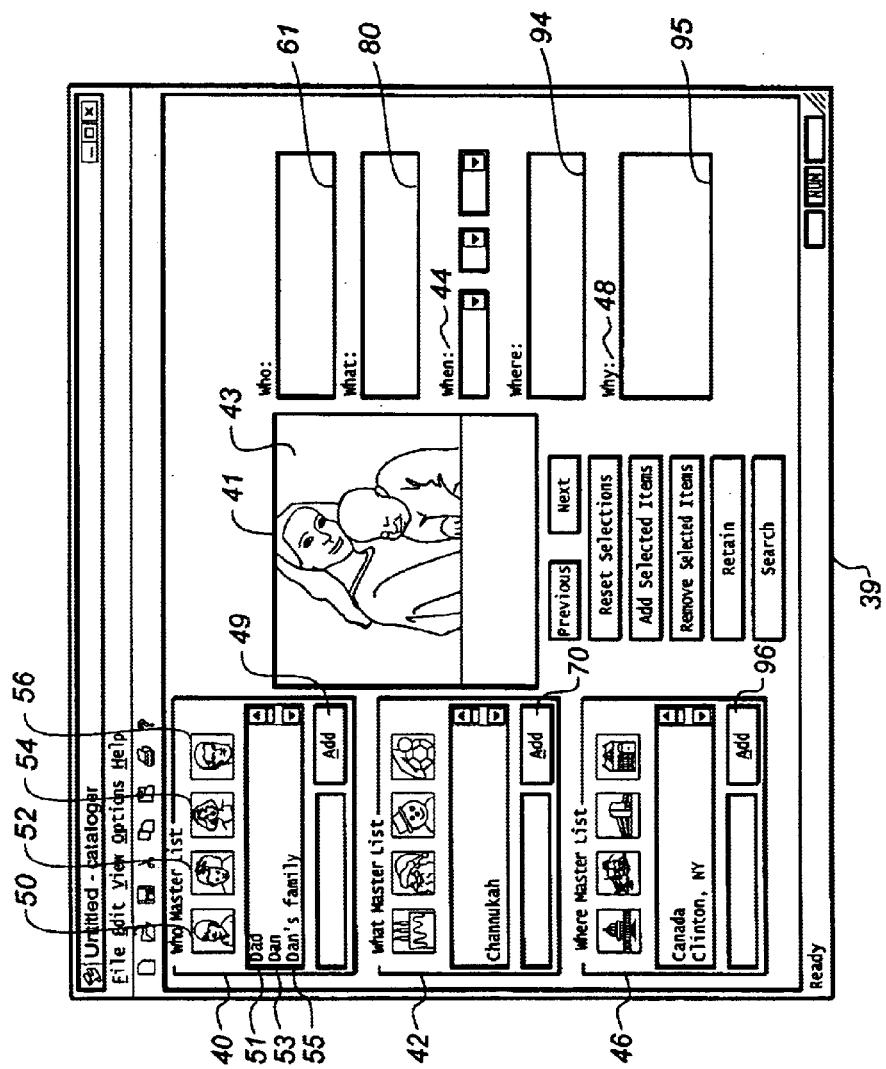
Figure 3C:
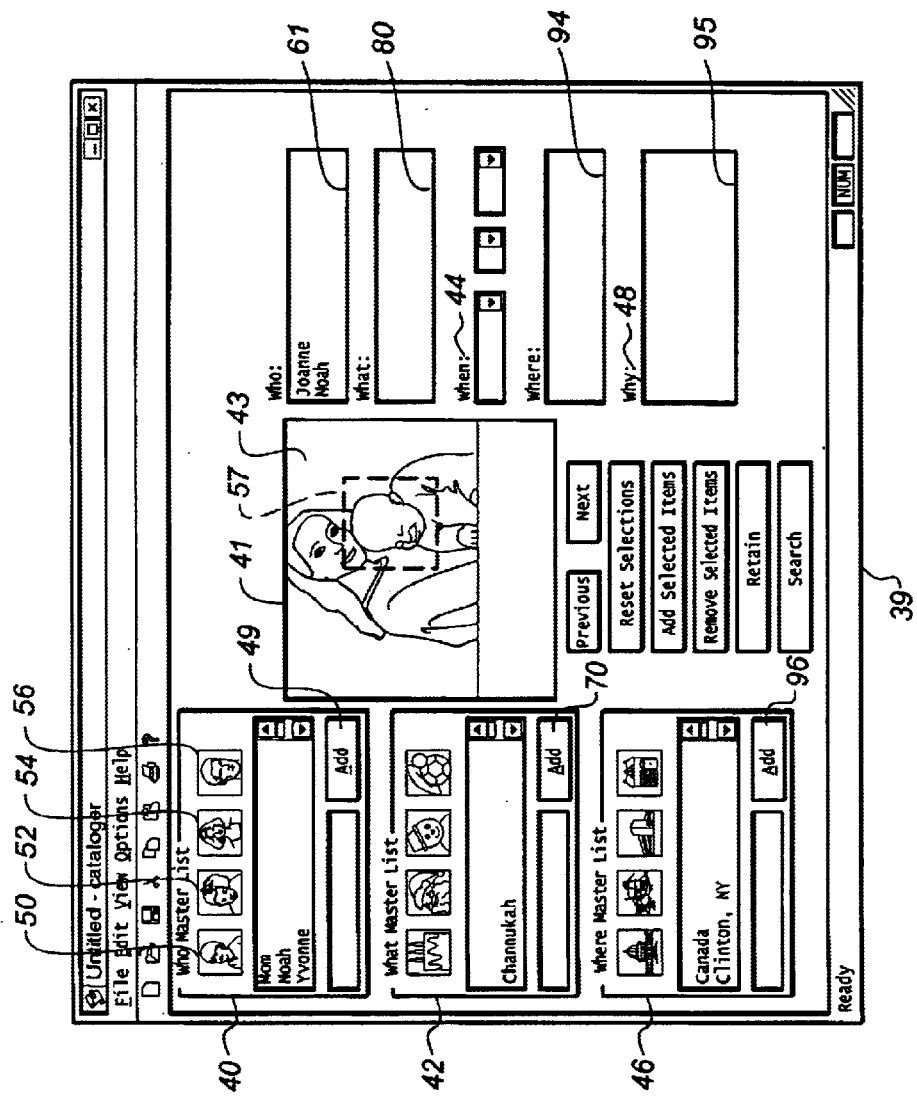

Referring to FIGS. 3A–3G there is illustrated a series of computer display screens that illustrate the use of the computer software program of the present invention. Referring to FIG. 3A there is illustrated a computer screen which illustrates one of the first screens viewed by the user when the program is activated. In the particular embodiment illustrated there are various choices provided to the user. In particular, the user may obtain images by selecting item 1 in which case, by selecting this item, options will be provided for the user. For example, obtaining images from a scanner, a digital camera 27 (see FIG. 1), from a third party source such as a service provider, friend, relative, or business associate, etc. It is to be understood that the digital images may be obtained from any appropriate source. Another option is to open an existing digital data file containing digital images. In the embodiment illustrated, the user has selected the first option of obtaining a digital image on file. FIG. 3B illustrates the first working screen 40 after the image or images that have been obtained and are ready for cataloging. As illustrated by FIG. 3B, the initial working screen 40 has a working window 41 in which the image or images to be cataloged will be displayed. When a plurality of images are to be cataloged, the images will be sequentially displayed in window 41 until the user is done cataloging the selected images. As illustrated by FIG. 3B, the first image 43 is illustrated in window 41. The working screen 39 includes at least one selection category for categorizing of images. It is to be understood that any desired number of selection categories may be provided by the software program or created by the user. In the particular embodiment, there is provided five (5) selection categories 40, 42, 44, 46, and 48. In particular selection category 40 is directed to "Who", meaning who are the individuals in the image 44 that are to be identified with the image. In selection category 40, there is provided a plurality of the image icons 50, 52, 54, and 56 for allowing the user to quickly and easily categorize the image 44. In the particular embodiment illustrated, the icons 50, 52, 54, 56 are individuals that are in some way known to the user. There is also provided a list of text identifiers 51, 53 and 55 which can also be used to associate information with the image. The identifiers may correspond to the icons 50, 52, 54 and 56 if so desired. In the particular embodiment illustrated, icon 50 identifies individual name "Dan", icon 52 identified the individual "Sally", icon 54 identifies "Mom" and icon 56 identifies "Dad". It is, of course, understood that the various icons can be used to identify anyone or subject desired by the user. As discussed later herein, these individual icons may be personalized in accordance with the wishes of the user. Thus, each of the icons can represent a name, a relationship, or any other desired reference. In the embodiment illustrated, the icons 50–56 each refer to individuals. However, these icons could have also referred to groups of individuals. For example, family, choir, co-workers, etc. Of particular interest is that the icons illustrated in selection category 40 are all personalized according to the user and provide quick visual identification of the category. In the embodiment illustrated, the icons are actually images of the individual identified as "Dan", "Sally", "Mom", or "Dad". Thus, if in the image 43 there is illustrated an image of "Mom" and/or "Sally", in order to associate that information with image 43, the user would take an appropriate selection device, for example, the use of a mouse 18 or keyboard 16 whereby a selection arrow will be placed over the two appropriate icons and selected. As illustrated in FIG. 3C, display window 50 displays the information that is to be associated with the image 43. In the embodiment illustrated, both text and visual icons with be associated with the image 43. As shown by FIG. 3C, the individuals have been identified as "Joanne" and "Noah". This information (meta data) is attached to the image file which can be used for searching and/or displaying of information when the images are later searched and/or displayed.

An add button 49 is provided in association with selection category 40 so that new icons and/or text identifiers may be provided for selection by the user. For example, during viewing of an image in window 41, a new individual may be viewed and the user wishes to associate this new individual with this image and possible other images. By selecting the add button 49, an arrow should show up on the image that would allow the user to identify an area of the image, for example, the portion of the image where this new individual is located. In FIG. 3C, the selected area is indicated by dash line 57. Then the user can select that this area be created as a new selection icon for selection category 40. Alternatively or in addition thereto, new text identifier by itself or in conjunction with the icon could be created. The new icon or text identifier can then be used in categorizing images provided in window 41 in the same manner as the other icons.

Alternatively, add button 49 could initiate a dialog box wherein a user could specify a specific location or universal resource locator (URL) on the internet 24 of a third party who provides pre-constructed icons with associated text identifiers for downloading into the software. These icons may be provided for a fee or they may be provided for free if the user provides some information. The downloaded icons are automatically assigned to the proper selection category or if appropriate, new categories are automatically created to contain the downloaded icons.

Figure 3D:
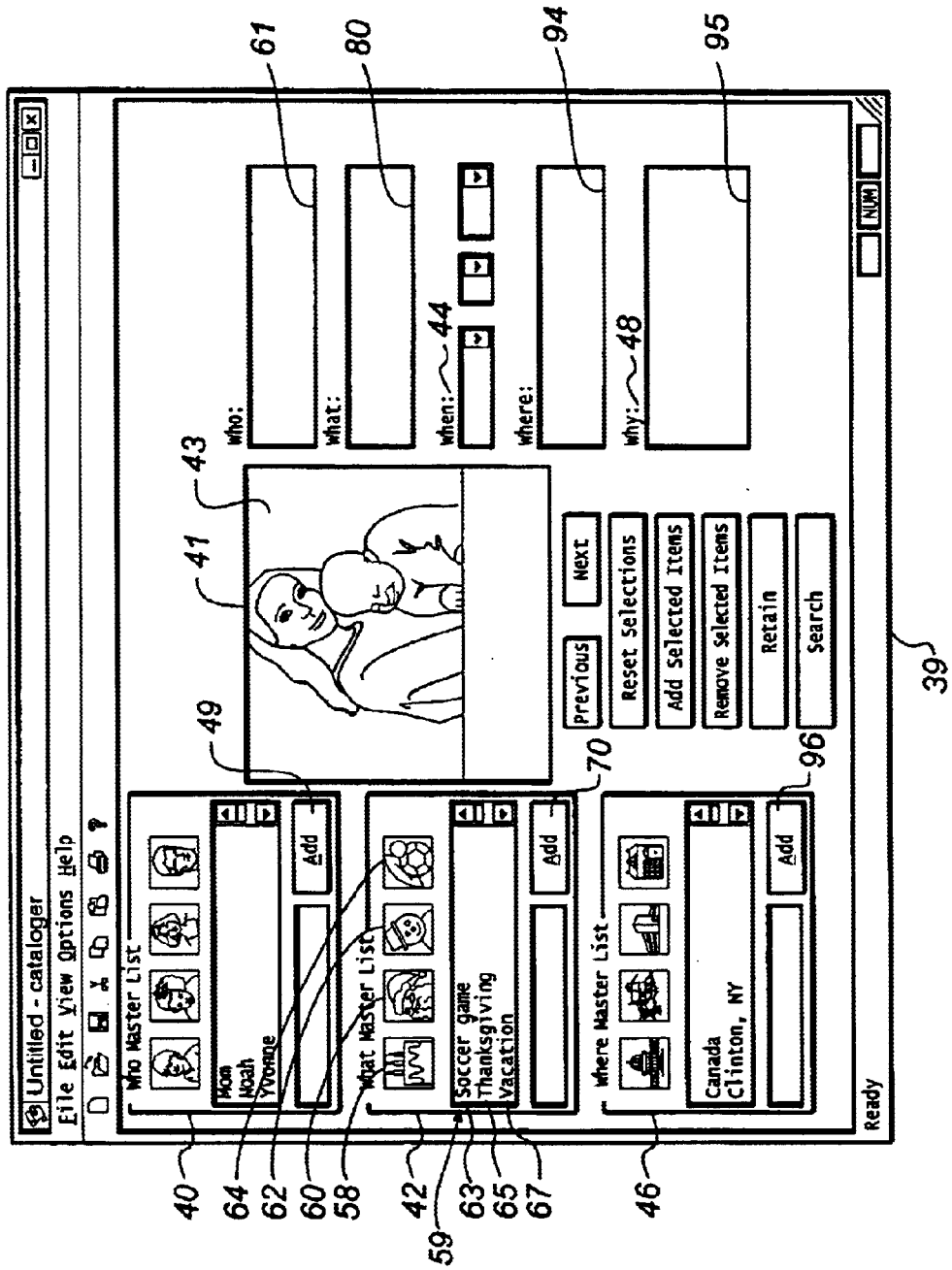

Referring to FIG. 3D, the "What" selection category 42 is selected by the user. Selection category 42 has various icons which identify particular events and also a corresponding list 59 set forth. Any one of the icons 58, 60, 62, 64 or selection items 63, 65, and 67 may be selected. As with selection box 40 there is the ability to add additional information by the add button 70 which operates in the same manner as button 49 previously discussed. Once the appropriate selections have been made, the information associated with the selected icons or text will be displayed in display window 80.

Figure 3E:
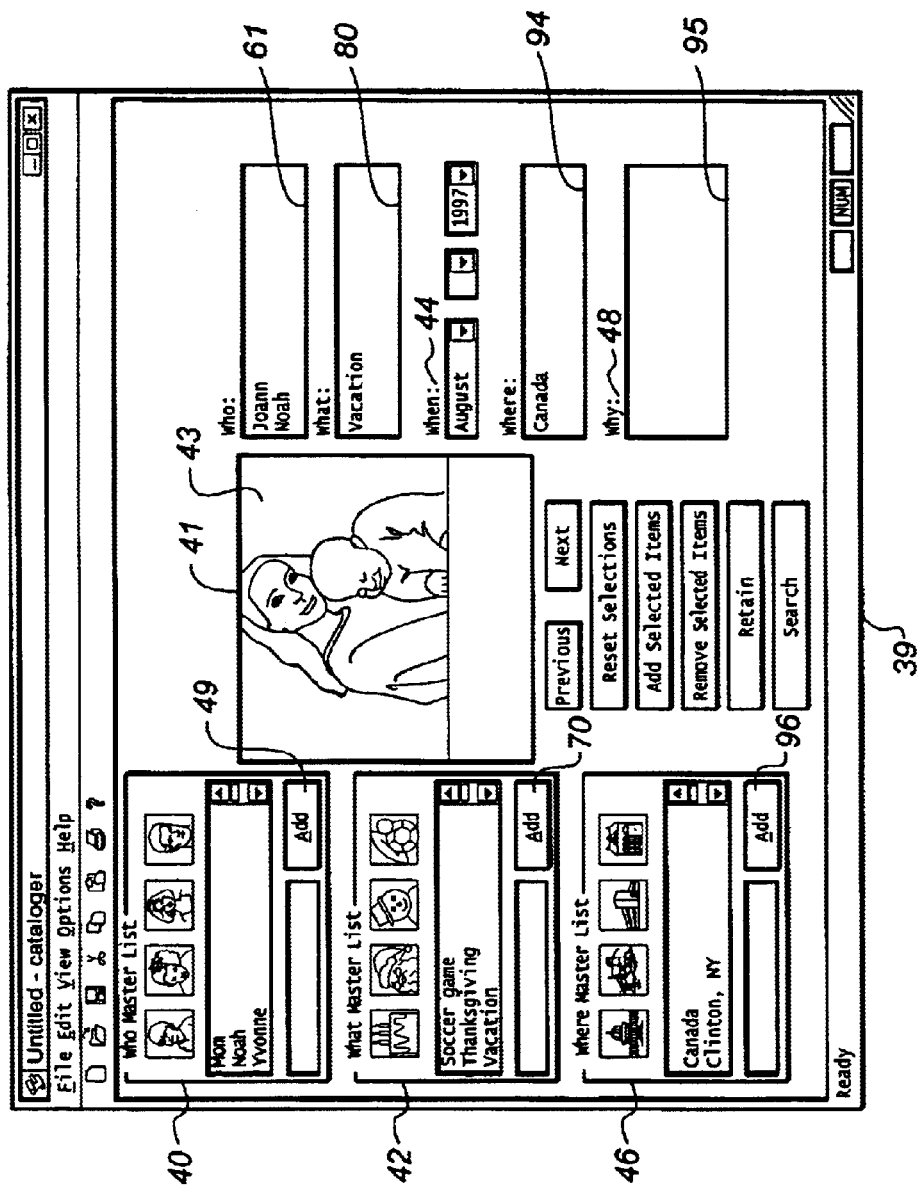

The next selection category 44 in the particular embodiment illustrated is the "When". As illustrated by FIG. 3E, the "When" category comprises a category wherein a date may be entered. The date may be the date of capture of the image or the date when the user is using the program. In the embodiment illustrated, the date of manipulation of the image will be automatically entered if there is no previous date supplied. However, the date may be provided with the original image. For example, there currently exists the APS photographic system which uses a film strip having a magnetic layer upon which information can be provided by the camera that captures the image. Various types of information can be added by the camera that can used later in the photofinishing process. An example of such information is the date. This information can be maintained with the image and when the image is digitally scanned by a service provider, the date recorded on the film can be associated with the image. The service provider may download the image to the user in which case the date downloaded can be imported automatically into the program used by the user. It is to be understood that any other pertinent data may be added automatically to the cataloging program. For example, but not way of limitation, additional data may be provided on the scanned film, provided by way of a digital camera, or even by a third party source such as the photofinisher.

Figure 3F:
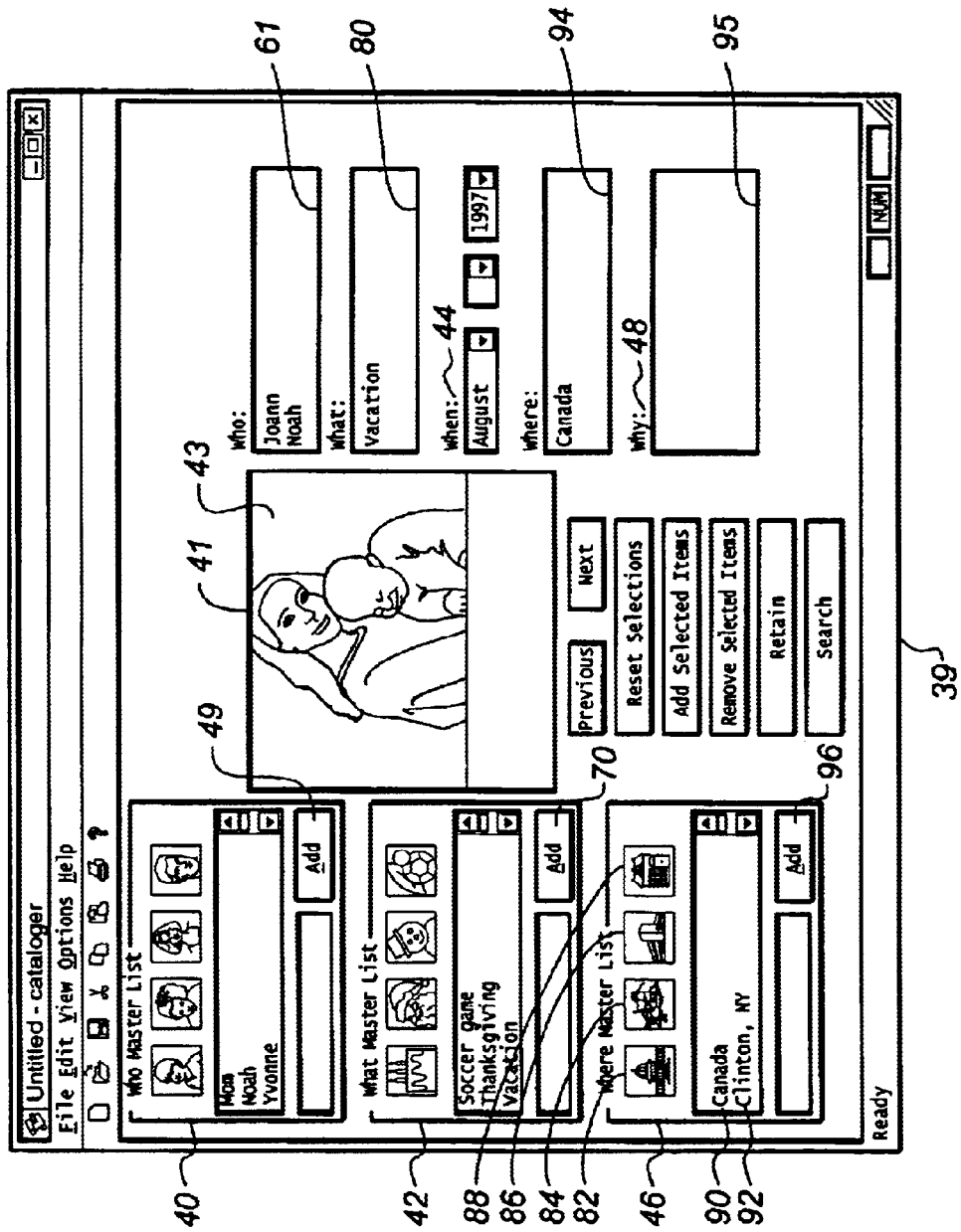

Referring to FIG. 3F, the next selection category 46 "Where" is illustrated. In the particular embodiment illustrated there are four icons, 82, 84, 86, and 88 which can be selected for association with the image in window 42. In addition, as previously discussed, a selection window having other information such as personalized places can be added. For example, in the embodiment illustrated by items 88 and 90, two additional places are provided, i.e., Canada and/or Clinton, N.Y. The icons 82, 84, 86, and 88 respectively refer to images or places directly associated to the consumer. For example, the first icon may represent a work location, the icon 84 can represent home, the third icon can represent a particular place or theme park that was visited, and the last icon 88, could represent a relative's place. Once having selected the appropriate "Where", this is entered in and illustrated in display window 94. As previously discussed, additional new items may be added to the where category by the add button 96 which operates in the same manner as the other add buttons previously discussed.

Figure 3G:
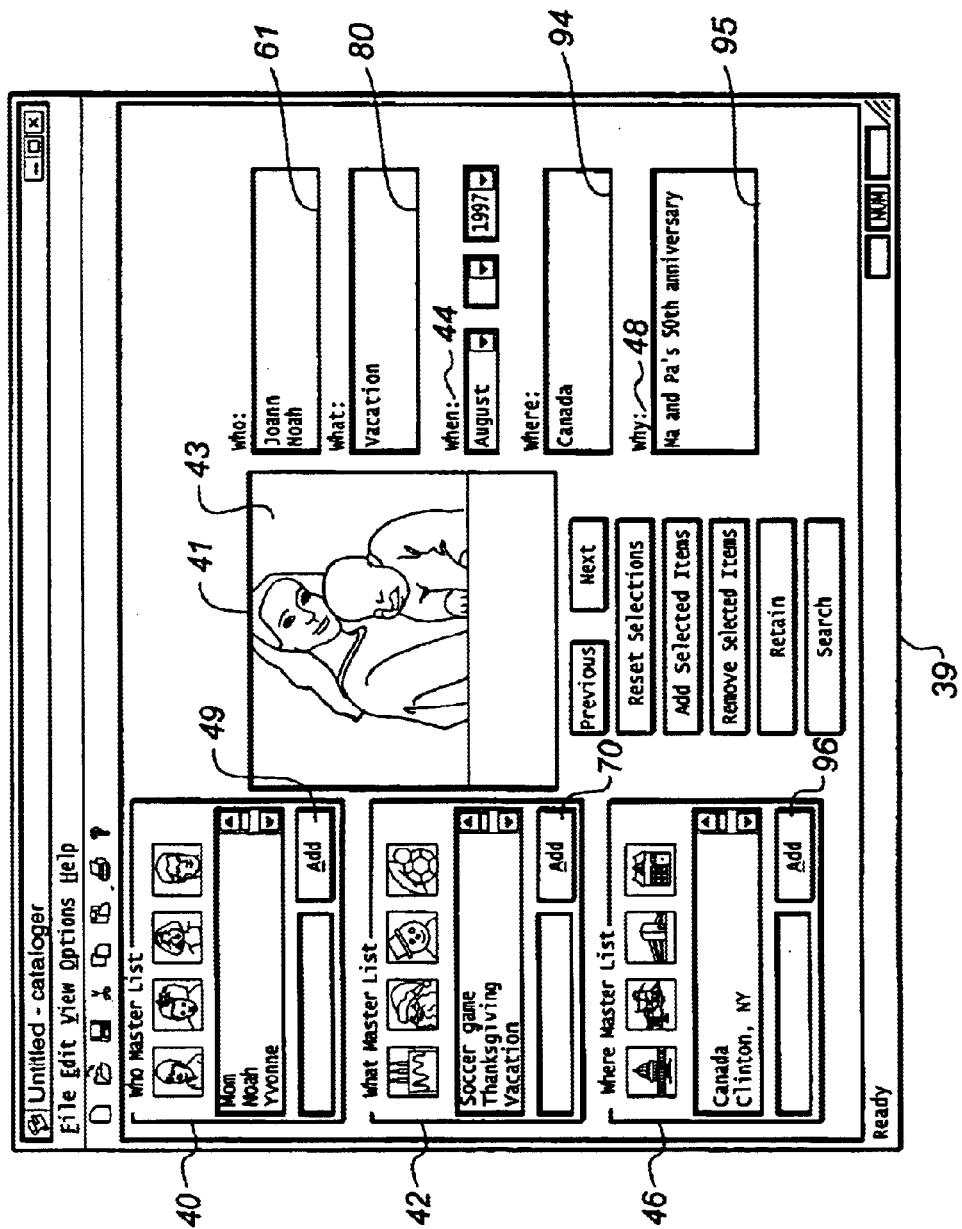

In the particular embodiment illustrated, the last selection category 48 is "Why". Referring to FIG. 3G, there is illustrated the reason why the people were gathered. In the particular embodiment illustrated, this is "Ma's and Pa's" $50^{th}$ anniversary party. This information in the particular embodiment was manually entered and is illustrated in display window 94. However, it is desired that appropriate icons could be personalized and added for selection thereof.

Figure 3H:
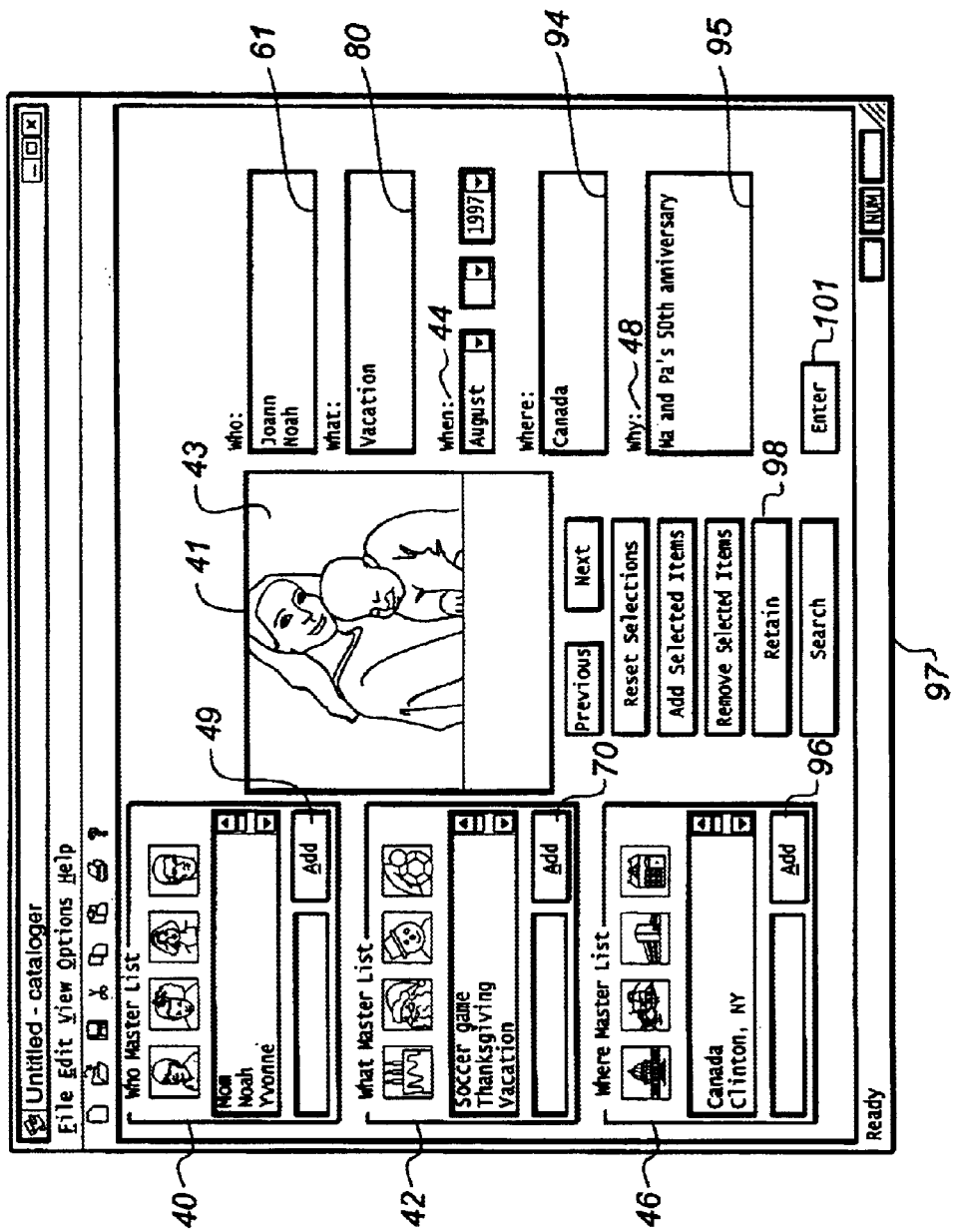

FIG. 3H illustrates the screen whereby all the information will be kept as entered or revised and is shown by display screen 97. The data is retained by depressing the enter key on the keyboard 16 or an equivalent button 101 provided on the screen. The next image, if there is one, would then be presented for categorizing. A retain button 98 is provided so that the user can repeat the same selections made for the previous image for the image currently being displayed. If only some of the categories are to be the same for the next image, the retain button 98 can be selected and then editing of the desired category may be accomplished relatively quick and easy. Once the information has been properly provided for all of the images, the images and associated information that has been entered is stored in a digital file or other appropriate digital memory storage device or location. Thus, anytime the image is reselected at a later time, the information and search categories can be accessed and used as desired as discussed later herein.

The icons used for selection categories may be icons originally provided with the software program, provided by a third party, and/or as illustrated above the icon can be created and personalized by the user. In a similar manner, the selection categories may also be originally provided by the software program, provided by a third party and/or created by the user. This allows the user to be able to use the program as initially provided or personalize the software program with the desired categories and icons specifically suited to meet the needs of the user. For example, the user would initially review a plurality of selection categories and image icons and select the desired categories and icon for use with the program. Additionally, during this initial set-up, personalized categories and/or icons may be added by the user as desired. Once the computer software program has been set-up, the categorization of images by the user can proceed. The present invention also allows the user to modify the selection categories and/or icons at any time by use of the add button 49, 70, or 96 as previously discussed. New categories and/or icons may be automatically provided by third parties or by other devices. For example, if an individual is using a camera at a theme park, meta data may be provided to the camera (digital or film-based) identifying a category and/or icon which would be read by a photoservice provider, the category and/or icon in turn would be provided with the digital image file. For example, a new icon providing an image of the theme park visited would be automatically associated with each of the images captured at the theme park. If no category or icon is present in the software that reads the icon and/or category, a new category and/or icon will be automatically created by the software for use with the current image and any further images used with the software.

The use of personalized icons and/or categories allows for quicker and easier association of the image and providing of meta data associated with the images. Further, the use of icons in the form of an image allows quicker and easier selection by the user as they are readily recognizable by the user and only require a simple click of a selection device to select.

The following is brief description on how a user would use the categorizing software of the present invention. In the beginning, user would obtain the desired image or images for categorizing. The images as previously discussed may be obtained from any source. For example, as previously discussed, the images may be obtained from a roll of film that has been developed and scanned so as to provide a digital record of the images which has been forwarded to the user electronically or by hard copy devices such as a computer disc, flash cards, etc. Alternatively, the images may be simply obtained from a computer file that has been stored or received. Once the image or images have been retrieved, then the user would go through each of the selection categories for the desired images and associate the desired icons with the images.

The user may also use the software to search and/or re-categorize digital images that have already been categorized. The user would identify a group or groups of images that have been previously categorized. Then the selection icons and/or text identifiers for the categories would be used as means for identifying the group and/or type of images desired. For example, if the user wanted all of the images associated with Dad and birthday the appropriate icons would be selected and the FIND feature would be selected. This would result in the images having these associated data being gathered. The user can then use the grouped images as desired. When the user has finished, the image can then be returned from where they were obtained. Alternatively, the images may be used to create a new group or reorganize existing groups. The user may categorize and reorganize any or all the images as desired. The grouping of the images being limited only by the icons and categories available to the user. As previously discussed the categories and icons are selected as desired by user.

The user may accept the icons as originally provided or select a customized feature whereby personalized icons can be added. This can be done at any time. Thus, the personal icons could be created initially upon receipt of the software and installed into the computer or they can be created as images are viewed. It is desirable to have as many icons initially provided so that all the images will have consistent icons for later sorting as discussed later herein. However, as new images are obtained, there is often a need to provide new and additional icons.

Figure 4:
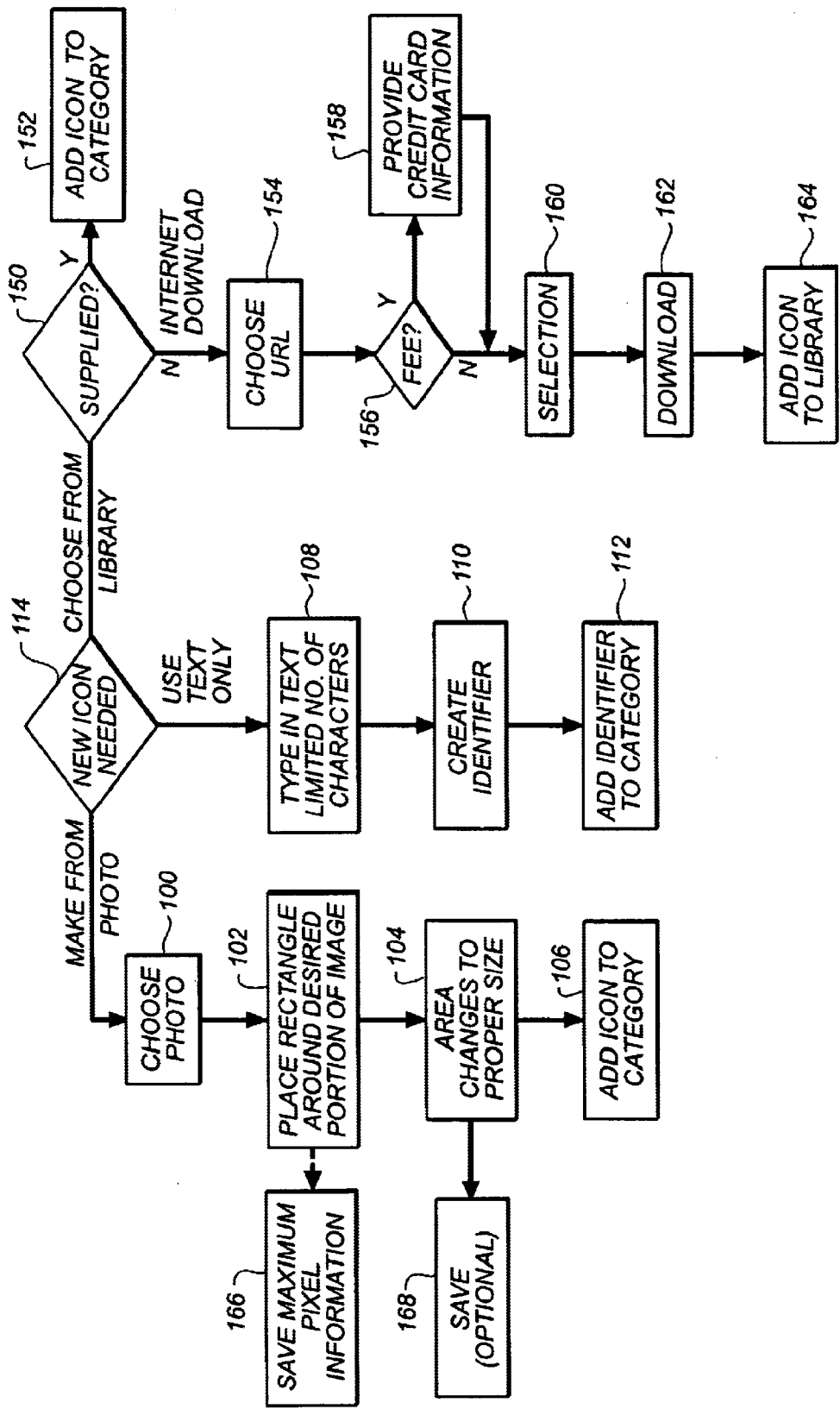
FIG. 4 is a flow diagram of the how a new icon or test identifier may be added to the selection menu.

Referring to FIG. 4, there is illustrated a flow chart illustrating how additional new icons can be added to the current selection categories. In FIG. 4, the image icon may be added during viewing of the images for categorizing. In particularly step 100, a photo is selected because the user may realize a new icon is necessary. In step 102 after selection of the appropriate button for the adding of a new icon, a portion 200 of the image is selected for use as an icon. At this point, portion 200 of the image may be optionally or automatically saved by the program in step 166 or 168 further retaining maximum pixel resolution for use in searching and automatically cataloging images that have not been cataloged, the specifics of which will be discussed later. In the particular embodiment illustrated, a square, representing the icon to be created, is placed around the portion 200 of an image as desired by the user. In step 104, the selected image is properly sized for use as an icon. Then the icon is added to the appropriate selection menu. Text information may be associated with the icon. Step 108 provides for the typing of text. At step 110, a new identifier is provided and at step 112, it is added to the list of identifiers. These identifiers may of course be associated with a particular icon. Alternatively, an icon from a library supplied with the program or by a third party may be added as illustrated by steps 150–168. In step 150, the user may decide to add an icon supplied by the program as shown in step 152 which is directly added to a category or he may choose to connect to a third party to download an icon from the third party library. The user chooses the third party download in step 154 by supplying a universal resource locator (URL) to an internet browser such as the Internet Explorer browser produced by Microsoft Inc. The browser facilitates the network connection to the third party library supplier via the internet 24. Some libraries might cause the user to incur a fee and such information to satisfy payment is supplied in step 158. Otherwise, the choice in step 156 leads to an icon selection step 160 followed by step 162 for downloading the icon using standard internet file transfer protocol (ftp). The downloaded icon is then added to a category in step 164.

Figure 5A:
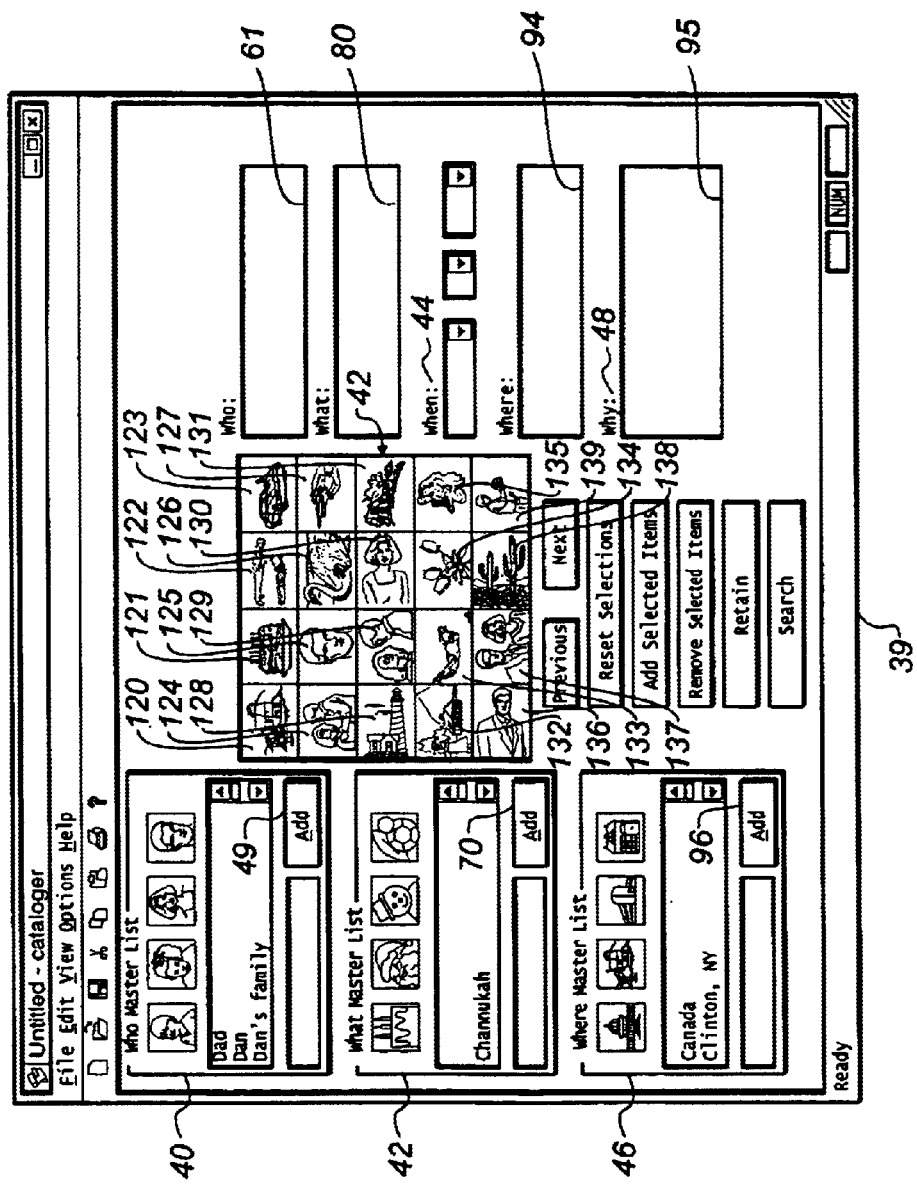
FIGS. 5A and 5B illustrate a display screen a modified form of the present invention.
Figure 5B:
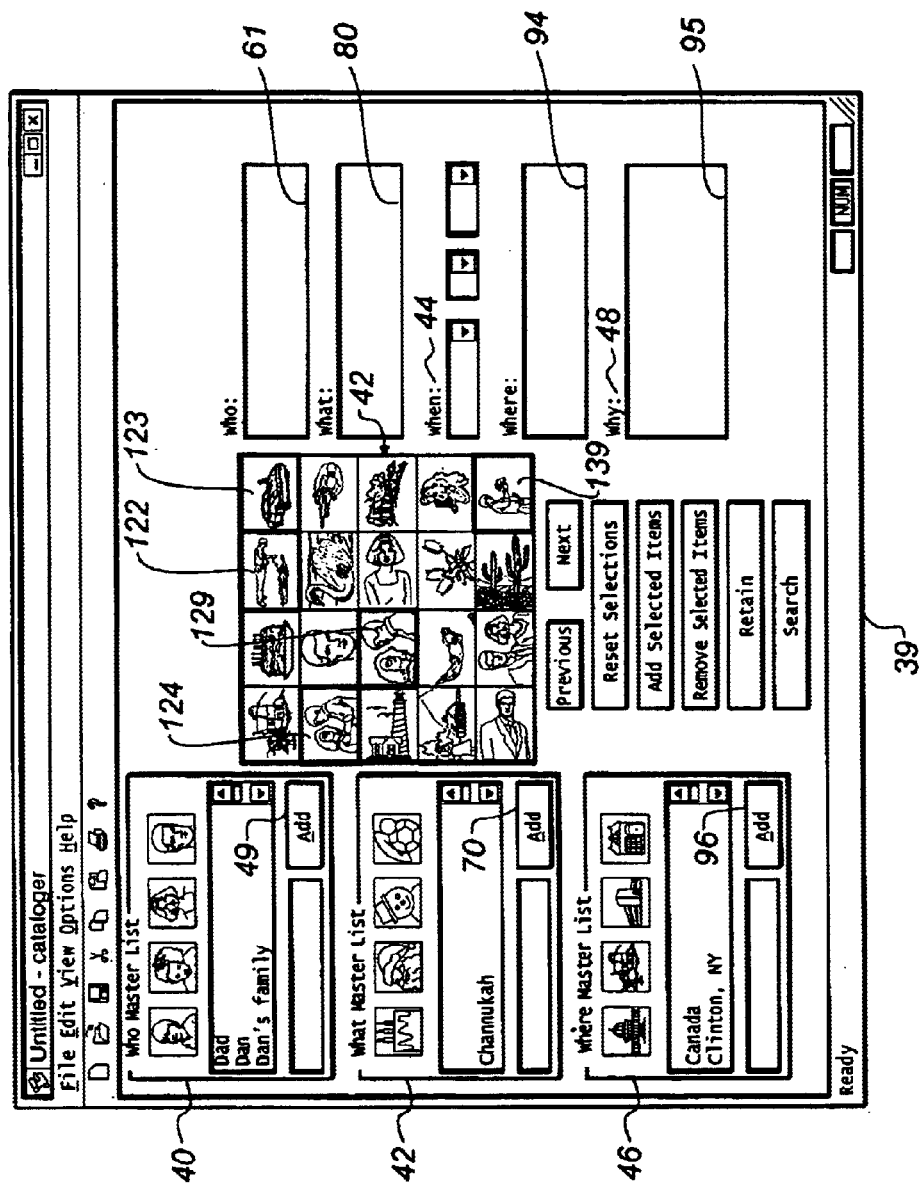

Referring to FIG. 5A, there is illustrated a modified display screen of the software made in accordance with the present invention, like numerals indicating like items and operations as previously discussed. In this embodiment, a plurality of images 120–139 are provided within window 42. In this embodiment, individual images, selected groups of images, or all of the images may be categorized at the same time. For example, all of the images may be categorized as a group. Alternatively, groups of images may be categorized. As illustrated by FIG. 5B, images 122, 123, 124, 129 and 139 are selected for categorization. Once selected, the appropriated icons of the desired categories are selected and associated with the selected images. If desired, the images may be selected individually for categorization. This system is particularly useful when receiving a plurality of images that were obtained from a single source, for example, a roll of photographic film. Typically, images from a single source will have a number of common themes among the images. This set-up allows for the quick grouping and categorization of the images. Similarly, when images are retrieved from a storage image file or files, the images can be viewed as a group allowing easier selection and/or reorganization.

Once all the images have been appropriately categorized and/or reorganized, they are forwarded to a device for storage and use. The user may have a variety of options, for example, the printing, displaying and/or transmitting of the images with or without all of the associated images. One of the benefits of the present invention is that since all of the images have associated data in a variety of different fields, the reclassification and reorganization of these images can be done in a quick and easy manner by appropriately building a search request for reconstructing a recalling of images. In particular, should someone want all of the pictures of "Grandpa" from a time period to a time period taken on birthdays, this could easily be retrieved by entering of the appropriate information in the appropriate selection categories. It can thus be seen that any desired combination of groupings may be selected by the user for recategorizing of the images which can be used in a variety of different ways. For example, but not by way of limitation, the reorganized images may be sent and shared with other third parties over the internet or forwarded to an image service provider for production of image products to be delivered as a gift to a third party. For example, associated photo images may be provided as a photo album or album pages which can be sent to a third party. For example, images that were taken over years of sporting events may be sent to a grandparent for their use and review in any desired manner. The grouping of images can also be very useful in ordering of certain goods and/or services. For example, if album pages are being ordered, the grouping of the images by desired categories could be a first step in placing the image in the desired grouping and order.

A more detailed description of such is described in U.S. Ser. No. 09/802,387 filed Mar. 9, 2001 (abandoned) of Carl A. Test et al., entitled "A Product And Method For Organizing And Searching Digital Images" and which is hereby incorporated by reference.

Thus, it can be seen that the vast library of images can now be reaccessed and reorganized as desired by the user or any recipient who has access to the images. Likewise, the software used for organizing and retrieving the images could also be forwarded with the images to a third party so that the third party may be able to use these images in the same manner as the user that forwarded the images.

In the particular embodiment illustrated, the software program is illustrated as being run on a computer that the user has direct access. The present invention is not so limited. For example, the program may reside at a remote location, such as a photoservice provider that can be accessed over communication links, such as the internet. In such case, the software program and maybe even the image to be categorized may be stored.

In the preceding discussion, the invention has shown the creation and use of the image icons to assist the user in the cataloging of images. Referring once again to step 166 of FIG. 4, the maximum pixel resolution of the portion 200 of the image to be used for an icon has been saved for use in searching and automatically cataloging images that have not been cataloged. In this aspect of the invention, the actual image information contained in the pixels comprising portion 200 of the image or by an analysis of this information resulting in certain characteristics of this information is used by the program to search non-cataloged images for similar or nearly matching image information contained in the pixels of the non-cataloged images. Upon finding such images, the program causes the meta data associated with the icon created in step 106 of FIG. 4 to be appended to the newly found images. An example would be that an icon of the face of an individual would be created. The stored maximum pixel resolution correlated to the created icon would then be analyzed to determine certain characteristics. These characteristics would then be used to review noncataloged images and when images having these characteristics are found, then the icon correlated to that face of that individual would be associated therewith. An example of such a characteristics that can be used is described in co pending U.S. Ser. No. 09/802,387 filed Mar. 9, 2001 (abandoned) of Carl A. Test et al., entitled "A Product And Method For Organizing And Searching Digital Images" and which is hereby incorporated by reference.

In this application the pixels of the icon are analyzed for outline patterns. The images to be reviewed are analyzed to see if these patterns exist. When a match is found this is ah indication that the image of the icon is present in the reviewed image. Using the forgoing technique non-categorized images can be quickly and easily cataloged with little or no review by the user.

It is to be understood that various other changes and modifications may be made without departing from the scope of the present invention. The present invention being defined by the claims set forth below.

Parts List
10 system
12 computer
14 display device
16 keypad/keyboard
18 mouse
20 scanner
22 ISP
24 internet
26 photoservice provider
27 digital camera
28 third party
30 first step
32 step
34 step
38 numeral
39 screen
40 screen (also listed as selection category)
41 window
42 window (also listed as selection category)
43 image
44 image (also listed as selection category)
46 selection category
48 selection category
49 add button
50 image icon
51 text identifier
52 image icon
53 text identifier
54 image icon
55 image icon
56 image icon
57 dash line
58 icon
59 list
60 icon
62 icon
63 selection item
64 icon
65 selection item
67 selection item
70 add button
80 display window
82 icon
84 icon
86 icon
88 icon
90 item
94 display window
96 add button
97 display screen
98 retain button
100 step
101 button
102 step
104 step
106 step
108 step 110 step
112 step
114 step
122 image
123 image
124 image
129 image
139 image
150 step
152 step
154 step
156 step
158 step
160 step
162 step
164 step
166 step
168 step
200 portion

What is claimed is:

1. A computer software product comprising a computer readable storage medium having a computer program which when loaded into a computer of a digital image forming device causes the computer to perform the following steps:
   displaying at least one digital image for categorization;
   displaying at least one digital image icon associated with a selection category that can be associated with the digital image being displayed: and
   selecting one of said at least one digital image icon associated and categorization of said at least one digital image.

2. A computer software product according to claim 1, wherein said at least one digital image icon comprises a plurality of different digital image icons each associated with a different selection category.

3. A computer software product according to claim 1, wherein said at least one digital image icon is associated with a corresponding text.

4. A computer software product according to claim 1, further comprising the step of:
   providing an addition selection feature for adding customized icons.

5. A computer software product according to claim 4, wherein said digital image icon is obtained using the digital image being categorized.

6. A computer software product according to claim 1, wherein said at least one selection category comprises at least one of the following:
   Who;
   What;
   Where;
   When;
   Why.

7. A computer software product according to claim 1, wherein said software product further provides the steps of:
   providing for the addition of a new digital image icon for use in categorizing.

8. A computer software product according to claim 7, wherein said new digital image icon is obtained from said at least one digital image for categorization.

9. A method for organizing a plurality of digital images comprising the steps of:
   displaying a plurality of digital images; and
   categorizing at least one of said plurality of digital images using at least one digital image icon associated with a selection category.

10. A method according to claim 9, wherein said at least one digital image icon comprises a plurality of digital image icons, each of said plurality of icons being associated with a different selection category.

11. A method according to claim 9, wherein said digital image icon is associated with a corresponding text.

12. A method according to claim 9, further comprising the step of:
    providing an addition selection feature for adding a customized digital image icon.

13. A method according to claim 12, wherein said customized digital image icon is obtained using the digital image being categorized.

14. A method according to claim 9, wherein said at least one selection category comprises at least one of the following:
    Who;
    What;
    Where;
    When;
    Why.

15. A method according to claim 9, wherein said software product further provides the step of:
    providing for the addition of a new digital image icon for use in categorizing.

16. A method according to claim 15, wherein said new digital image icon is obtained from said at least one digital image for categorization.

17. A computer software product comprising a computer readable storage medium having a computer program which when loaded into a computer of a digital image forming device causes the computer to perform the following steps:
    displaying at least one distal image icon associated with a selection category that has been associated with at least one digital image;
    digital image that has been previously categorized; and
    retrieving said at least one digital image from a plurality of digital images that have been previously categorized based on the selection of one of said at least one digital image icon.

18. A method for retrieving at least one digital image from a plurality of digital images that have been previously categorized, comprising the steps of:
    displaying at least one digital image icon associated with a selection category that has been associated with said at least one digital image; and
    retrieving said at least one digital image from a plurality of digital images that have been previously categorized based on the selection of one of said at least one digital image icon.

19. A method for automatically organizing a plurality of digital images comprising the steps of:
    providing at least one distal image icon associated with a category,
    using predetermined characteristics of said icon for use in identifying non-categorized digital images for associating said identified non-categorized image with said category.

20. A method according to claim 19, wherein said predetermined characteristics comprise analyzing the pixel content of said digital image icon.

21. A computer software product for automatically categorizing digital images comprising a computer readable storage medium having a computer program which when loaded into a computer of a digital image forming device causes the computer to perform the following steps:

providing at least one digital image icon associated with a category, using predetermined characteristics of said icon for use in identifying non-categorized digital images for associating said identified non-categorized image with said category.

22. A computer software product according to claim 21, wherein said predetermined characteristics comprise analyzing the pixel content of said digital image icon.

23. A method for personalizing a digital image computer software program, comprising the steps of:

a. providing a categorization/retrieval program that uses categories and digital image icons for use in categorizing and/or retrieving digital digital images;

b. selecting from a plurality of stored categories at least one selection category; and c. selecting from a plurality of stored digital image icons at least one digital image icon for use with said at least one selection category.

24. A method according to claim 23, further comprising the step of:

adding a personalized selection category as determined by the user.

25. A method according to claim 23, further comprising the step of:

adding a personalized digital image icon for use with said at least one selection category or said personalized category.

26. A method according to claim 23, further comprising the step of automatically adding a new category or icon to said program in response to information provided with a digital image that is used by said program.

* * * * *

UNITED STATES PATENT AND TRADEMARK OFFICE
CERTIFICATE OF CORRECTION

PATENT NO. : 6,810,149 B1  Page 1 of 1
APPLICATION NO. : 09/640938
DATED : October 26, 2004
INVENTOR(S) : John R. Squilla et al.

It is certified that error appears in the above-identified patent and that said Letters Patent is hereby corrected as shown below:

| | |
|---|---|
| Column 11, claim 1, line 28 | Please replace ":" with --;-- |
| Column 11, claim 1, line 30 | Please replace the word "associated" with the words --for association-- |
| Column 12, claim 17, line 33 | Please replace the word "distal" with the word --digital-- |
| Column 12, claim 19, line 54 | Please replace the word "distal" with the word --digital-- |
| Column 13, claim 23, line 14 | Please remove one occurrence of the word "digital" |

Signed and Sealed this

Seventeenth Day of February, 2009

JOHN DOLL
*Acting Director of the United States Patent and Trademark Office*

UNITED STATES PATENT AND TRADEMARK OFFICE
CERTIFICATE OF CORRECTION

| | | |
|---|---|---|
| PATENT NO. | : 6,810,149 B1 | Page 1 of 1 |
| APPLICATION NO. | : 09/640938 | |
| DATED | : October 26, 2004 | |
| INVENTOR(S) | : John R. Squilla et al. | |

It is certified that error appears in the above-identified patent and that said Letters Patent is hereby corrected as shown below:

Issued Patent

| Column | Line | Description |
|---|---|---|
| 9 | 19 | Delete "Ser. No. 09/802,387 filed March 9, 2001 (abandoned)" and insert -- Ser. No. 09/640,642, filed concurrently herewith, now US patent 6,745,186, -- |
| 9 | 62-63 | Delete "Ser. No. 09/802,387 filed March 9, 2001 (abandoned)" and insert -- Ser. No. 09/640,642, filed concurrently herewith, now US patent 6,745,186, -- |

Signed and Sealed this
Fifteenth Day of March, 2011

David J. Kappos
*Director of the United States Patent and Trademark Office*